(12) United States Patent
Vetter et al.

(10) Patent No.: US 9,560,112 B2
(45) Date of Patent: Jan. 31, 2017

(54) METHOD FOR OPERATING FIELD DEVICES

(71) Applicant: CodeWrights GmbH, Karlsruhe (DE)

(72) Inventors: Immanuel Vetter, Sinzheim (DE); Hans-Ulrich Schlieben, Karlsruhe (DE)

(73) Assignee: CodeWrights GmbH, Karlsruhe (DE)

( * ) Notice: Subject to any disclaimer, the term of this patent is extended or adjusted under 35 U.S.C. 154(b) by 228 days.

(21) Appl. No.: 14/570,239

(22) Filed: Dec. 15, 2014

(65) Prior Publication Data

US 2015/0172361 A1 Jun. 18, 2015

(30) Foreign Application Priority Data

Dec. 17, 2013 (DE) .......... 10 2013 114 199

(51) Int. Cl.
*G06F 3/00* (2006.01)
*H04L 29/08* (2006.01)
*G06F 3/0482* (2013.01)
*G06F 3/0481* (2013.01)
*G06F 3/0485* (2013.01)

(52) U.S. Cl.
CPC .......... *H04L 67/025* (2013.01); *G06F 3/0482* (2013.01); *G06F 3/0485* (2013.01); *G06F 3/04817* (2013.01); *H04L 67/125* (2013.01); *H04L 67/36* (2013.01)

(58) Field of Classification Search
CPC ..................................................... H04L 67/025
USPC .......................................................... 715/740
See application file for complete search history.

(56) References Cited

U.S. PATENT DOCUMENTS

| 2011/0072383 | A1 | 3/2011 | Olausson |
| 2012/0233573 | A1 | 9/2012 | Sullivan |

OTHER PUBLICATIONS

German Search Report, German PTO, Munich, Aug. 6, 2014.

*Primary Examiner* — William Titcomb
(74) *Attorney, Agent, or Firm* — Bacon & Thomas, PLLC

(57) ABSTRACT

A method to operate field devices using an operating device with a touch-sensitive input and/or display area via which, for the purpose of operation, a field-device-dependent main menu level is displayed with multiple segments and at least one first segmentation level, which is assigned to a specific segment. A zoom function is used to increase or reduce the size of a selected segment of the main menu level and change the transparency of the main menu level and the transparency of the first segmentation level so that the transparency of the main menu level increases and the transparency of the first segmentation level decreases when the user zooms in such that the first segmentation level becomes visible. The transparency of the main menu level decreases and the transparency of the first segmentation level increases when the user zooms out such that the main menu level becomes visible such that switching takes place between the main menu level and the first segmentation level assigned to the desired segment.

10 Claims, 1 Drawing Sheet

METHOD FOR OPERATING FIELD DEVICES

TECHNICAL FIELD

The invention refers to a method for operating field devices using an operating device.

BACKGROUND DISCUSSION

In process automation engineering and in production automation engineering, field devices are often used to record and/or influence process variables. To record process variables measuring devices or sensors are used, such as level measuring devices, flowmeters, pressure and temperature measuring devices, pH/ORP measuring devices, conductivity meters etc., with such devices measuring the process variables level, flow, pressure, temperature, pH value or conductivity respectively. Actuators, such as valves or pumps, via which it is possible to alter the flow of a liquid in a pipe section or the level in a vessel, are used to influence process variables.

In principle, the term field device refers to any device that is used close to the process and delivers or processes information that is relevant to the process. In addition to the measuring devices/sensors and actuators mentioned above, the term field device is also generally used to describe units that are directly connected to a fieldbus and used for communication with the higher-order units, such as remote I/Os, gateways, linking devices and wireless adapters.

The field devices must be parameterized or configured using parameters before the field device is commissioned and to service the field device when the field device is in operation at the site of the field device operator. Operating devices are used for configuration, particularly to read and/or write parameters. Such operating devices are generally implemented on a communication unit that is separate from the field device, such as an operating device for example, and communicate with the field device via an interface.

For this, operating devices are known from the prior art that relay a relatively high resolution of information via a comparatively large display, and enable very precise selection of individual information via a pointing device, such as a mouse or a trackball. This resulted in user interfaces with a large information content and a high level of detail. Tree and menu structures have proven to be a particularly convenient display format for the operation (configuration and/or maintenance) of field devices up to now. Here, the procedure is based on explicitly selecting objects with the pointer device in order to run functions on this object. In this way it was possible to navigate through structures to get to the appropriate position.

Nowadays, more and more mobile operating devices are in use that are fitted with a touch-sensitive input and/or display area, such as a touchscreen. Such touch-sensitive input and/or display areas are typically operated by finger gestures. Due to the mobility of the operating devices, there are restrictions particularly with regard to the size of the display. Alongside this, the precise selection via a pointer device—which in this case is usually a finger—has become significantly more difficult.

SUMMARY OF THE INVENTION

The problem addressed by the invention is that of enabling the easier operation of a field device using an operating device with a touch-sensitive input and/or display area.

According to the invention, the problem is solved by a method to operate field devices using an operating device, wherein the operating device has a touch-sensitive input and/or display area via which, for the purpose of operation, a field-device-dependent main menu level is displayed with multiple segments and at least a first segmentation level, which is assigned to a specific segment, wherein a zoom function is used to increase or reduce the size of a selected segment of the main menu level and change the transparency of the main menu level and the transparency of the first segmentation level in such a way that the transparency of the main menu level increases and the transparency of the first segmentation level decreases when the user zooms in, such that the first segmentation level becomes visible, and wherein the transparency of the main menu level decreases and the transparency of the first segmentation level increases when the user zooms out, such that the main menu level becomes visible such that switching takes place between the main menu level and the first segmentation level assigned to the desired segment.

According to the invention, therefore, when operating field devices using an operating device with a touch-sensitive input and/or display area, such as a touchscreen, the operator works with a main menu level that has different segments or regions. With the zoom function it is possible to switch between the main level and a first segmentation level below the main level.

In accordance with one advantageous embodiment, the zoom function switches between the first segmentation level and other segmentation levels.

In accordance with another advantageous embodiment, when the user switches using the zoom function a maximum of two segmentation levels or the main menu level and a segmentation level are displayed.

In accordance with another advantageous embodiment, every segment is indicated by an icon.

In accordance with another advantageous embodiment, the segmentation levels have operating elements that are used to operate the field device. In particular in accordance with the embodiment, color information can be assigned as an attribute to every operating element and the color information is propagated over multiple segmentation levels as far as the main menu level.

In accordance with another advantageous embodiment, continuous switching is possible via the zoom function.

In accordance with another advantageous embodiment, a scroll function is used to move display content of the touch-sensitive input and/or display area.

In accordance with an advantageous embodiment, the main menu level is displayed when the operating device starts.

BRIEF DESCRIPTION OF THE DRAWINGS

The invention is explained in more detail on the basis of the following drawings.

DETAILED DISCUSSION IN CONJUNCTION WITH THE DRAWINGS

Figure 1:
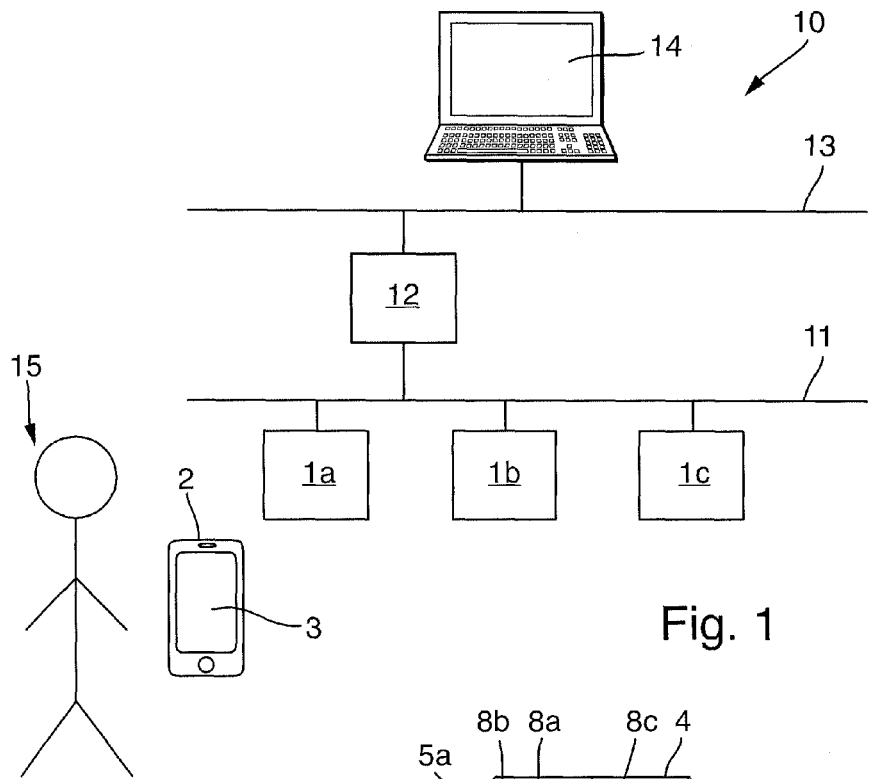
FIG. 1 shows a schematic representation of a facility in process automation engineering.

FIG. 1 shows an example of a schematic representation of a facility in process automation engineering 10. Here, three field devices 1a, 1b and 1c are connected to a first fieldbus segment 11. Alongside this, even more devices and/or fieldbus segments can be connected to the first fieldbus segment 11. In addition, a segment coupler 12 is illustrated that connects or couples the first fieldbus segment 11 with a second fieldbus segment 13. A higher-order unit 14, such as a SCADA system (SCADA: Supervisory Control and Data Acquisition), is connected to the second fieldbus segment 13. Alongside this, even more devices, such as an archiving system and/or an asset management system etc., and/or other fieldbus segments can be connected to the second fieldbus segment 13.

Before commissioning a field device 1a, 1b, 1c or before being use in a new application, the field device must be specifically configured or parameterized for the application so that it performs a desired function within the facility 10. Likewise, field devices are operated using an operating device 2 during maintenance. To this end, a mobile operating device 2 with a processor 3 (which is separate from the field device in question) is used.

The field devices concerned 1a, or 1b or 1c are operated via the operating device 2 as explained below with reference to FIG. 2. Therefore, an operator 15 can access the specific field device 1 via the operating device 2.

Depending on the operating device and the design of interfaces of the field device under configuration 1a, 1b or 1c, the communication connection between the operating device 2 and the specific field device 1a or 1b or 1c can have different forms. Wireless connections, such as Bluetooth, WLAN, etc., are conceivable.

Figure 2:
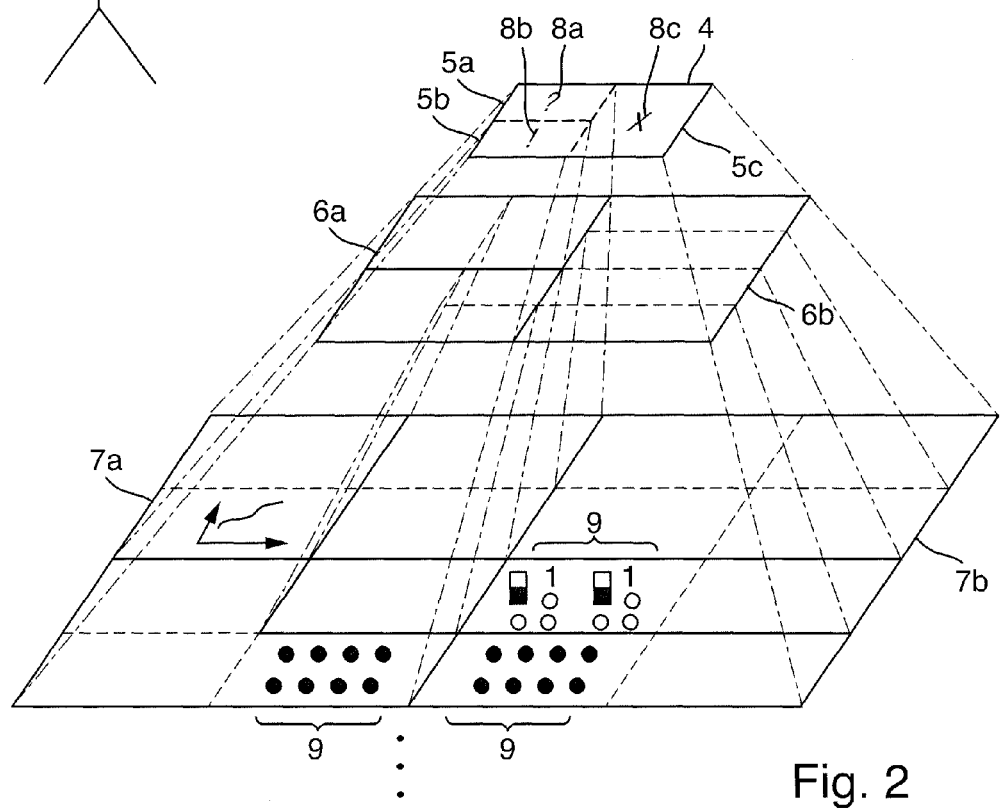
FIG. 2 shows a schematic representation of the levels that are used for field device operation as described in the invention.

FIG. 2 exemplifies a schematic representation of levels 4, 6, 7 that are used for the operation of a field device 1 as described in the invention. The levels 4, 6 and 7 here are over one another or behind one another, wherein the level of detail increases starting with the main menu level 4 through to the lowest segmentation level 7a, 7b or at least show different levels of detail.

In the sample case shown in FIG. 2, the main menu level 4 has three segments 5a, 5b and 5c which are each indicated by an icon 8a, 8b and 8c. As shown in FIG. 2, a question mark, a wrench and/or an exclamation mark can be displayed, for instance. Other icons 8 are, of course, also possible. Each segment 5a, 5b and 5c is used to run at least one specific function or group of functions of the field device 1. For example, the segment 5c, which is indicated by a wrench 8c, can be used to run all the maintenance functions of the field device 1 over the levels that are below the main menu level 6a and 7a. Here, the level of detail of the main menu level 4 is so low that typically specific operating elements 9 are not displayed to run a specific function of the field device 1 at the main menu level 4.

The operating elements 9 are located in one or in several segmentation levels 6, 7 which is/are assigned to every segment 5a, 5b and 5c of the main menu level 4.

In FIG. 2, for example, two segments of the first segmentation level or four segments of the first segmentation level are assigned for the two segments 5a and 5c, i.e. segment 5a, which is marked with a question mark 8a, and segment 5c, which is marked with a wrench 8c.

In this way, via a zoom function which an operator 15 directly controls or executes using finger gestures on the touch-sensitive input and/or display area 3 an operator 15 can zoom in from the main menu level 4 to the segmentation levels 6a, 7a (for 5a) or 6b, 7b (for 5b) assigned to the individual segment 5a, 5b or 5c.

Apart from the direct operation of the touch-sensitive input and/or display area 3 by finger or finger gestures, common tools such as a mouse can be used.

By actuating the zoom function, the level currently displayed (for example main menu level 4) is increased or decreased in size on the input and/or display area 3. At the same time, there is a change in the transparency of this level and the transparency of the level below or above the current level. In this way, when the user zooms in the transparency of the level currently still displayed can be increased and the transparency of the level that is not yet visible at the start and is below the level currently displayed can be reduced, whereas when the user zooms out the transparency of the level currently displayed increases and the transparency of the level that is not yet visible at the start and is above the level currently displayed is reduced. In this way, it is possible to use the zoom function to switch continuously between a current level and a level that is above or below the level currently displayed. In relation to FIG. 2, this means that it is possible, for example, to switch between the main menu level 4 and a segmentation level 6a or 6b that is assigned to a segment 5a, 5b, 5c. In addition, with the zoom function it is possible to switch between the first segmentation level 6 and other segmentation levels 7a and 7b in the same way. When switching using the zoom function a maximum of two levels are displayed, for example the main menu level 4 and a segmentation level 6a or 6b below this or two segmentation levels 6, 7 arranged below one another. In addition to the zoom function with which it is possible to zoom and also select certain levels, a scroll function is also provided which makes it possible to move display content, i.e. the picture currently displayed of the input and/or display area 3. Display content that is displayed on the input and/or display area 3 therefore constitutes the various segments of the main menu level 4 and the various segments of segmentation levels 6 or 7. Using the scroll function, it is also possible to navigate between the various segments of a level.

Operating elements 9, such as graphic buttons, controllers and diagrams of the field device are provided in the segmentation levels 6, 7 below the main menu level 4. The field device in question can be operated and/or configured using these operating elements. The operating elements 9 are designed in such a way that an operator 15 or the field device 1 itself can assign them color information as an attribute. Here, it is envisioned that the color information of an operating element 9 is propagated or passed on through to the main menu level such that information on the assigned color information is provided in segment 5a or 5b, wherein operating element 9, which has the color information, comes from the lower-order segmentation levels 6a, 7a or 6b, 7b of the segment 5a or 5b. This can be implemented, for example, in such a way that when color information of an operating element 9 is assigned, color information is also assigned as an attribute to the associated segment. For example, the segment could flash in a different color. Furthermore, provisions can also be made such that if the operating element is in a "lower" segmentation level, the color information is transported or propagated to a higher level.

1 Field device
2 Operating device
3 Touch-sensitive input and/or display area
4 Main menu level
5 Segments
6 First segmentation level
7 Other segmentation levels
8 Icon 9 Operating element
10 Process automation engineering facility
11 First fieldbus segment
12 Segment coupler
13 Second fieldbus segment
14 Higher-order unit
15 Operator

The invention claimed is:

1. A method to operate field devices using an operating device with a touch-sensitive input and/or display area, comprising the steps of:
    displaying, for the purpose of operation, a main menu level, which is dependent on the field device with multiple segments and at least a first segmentation level, which is assigned to a specific segment; using:
    a zoom function to increase or reduce the size of a selected segment of the main menu level; and
    change the transparency of the main menu level and the transparency of the first segmentation level in such a way that the transparency of the main menu level increases and the transparency of the first segmentation level decreases when the user zooms in such that the first segmentation level becomes visible, wherein:
    the transparency of the main menu level decreases and the transparency of the first segmentation level increases when the user zooms out such that the main menu level becomes visible such that switching takes place between the main menu level and the first segmentation level assigned to the desired segment.

2. The method as claimed in claim 1, wherein:
    with the zoom function it is possible to switch between the first segmentation level and other segmentation levels.

3. The method as claimed in claim 1, wherein:
    when switching using the zoom function a maximum of two segmentation levels are displayed, or the main menu level and a segmentation level are displayed.

4. Method as claimed in claim 1, wherein:
    each segment is indicated by an icon.

5. The method as claimed in claim 1, wherein:
    the segmentation levels have operating elements that are used to operate the field device.

6. The method as claimed in claim 5, further comprising the step of:
    assigning color information an attribute to every operating element and, wherein:
    the color information is propagated over multiple segmentation levels through to the main menu level.

7. The method as claimed in claim 1, wherein:
    continuous switching is possible via the zoom function.

8. The method as claimed in claim 1, further comprising the step of:
    a scroll function to move display content of the touch-sensitive input and/or display area.

9. The method as claimed in claim 1, wherein:
    the main menu level is displayed when the operating device is started.

10. The method as claimed in claim 1, wherein:
    at least one specific function or a group of functions of the field device can be run via every segment.

* * * * *